(12) United States Patent
Alsheimer

(10) Patent No.: US 12,496,586 B2
(45) Date of Patent: Dec. 16, 2025

(54) MICROPLATE FOR CONTAINING A PLURALITY OF SAMPLES

(71) Applicant: LEICA MICROSYSTEMS CMS GMBH, Wetzlar (DE)

(72) Inventor: Soeren Alsheimer, Frankfurt am Main (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 961 days.

(21) Appl. No.: 17/584,409

(22) Filed: Jan. 26, 2022

(65) Prior Publication Data
US 2022/0241792 A1    Aug. 4, 2022

(30) Foreign Application Priority Data
Jan. 29, 2021  (EP) .................................. 21154179

(51) Int. Cl.
*G01N 35/02*  (2006.01)
*B01L 9/00*  (2006.01)
(Continued)

(52) U.S. Cl.
CPC ............ *B01L 9/523* (2013.01); *G01N 35/028* (2013.01); *G01N 2035/00287* (2013.01); *G01N 2035/0403* (2013.01)

(58) Field of Classification Search
CPC .............................. G01N 35/028; B01L 9/523
See application file for complete search history.

(56) References Cited

U.S. PATENT DOCUMENTS 5,741,463 A * 4/1998 Sanadi ................. B01L 3/5085
                                                      436/178
6,610,474 B1 * 8/2003 Huang ................. C12N 9/6454
                                                      435/235.1
(Continued)

FOREIGN PATENT DOCUMENTS

WO    WO 2019/008189 A1    1/2019
WO    WO 2019/014541 A2    1/2019

OTHER PUBLICATIONS

Kim Jin-Young et al.: "3D spherical microtissues and microfluidic technology for multi-tissue experiments and analysis," Journal of Biotechnology, Elsevier, Amsterdam NL, vol. 205, Jan. 12, 2015 (Jan. 12, 2015), pp. 24-35, XP029240257.
(Continued)

*Primary Examiner* — Lyle Alexander
*Assistant Examiner* — Dwan A Gerido
(74) *Attorney, Agent, or Firm* — LEYDIG, VOIT & MAYER, LTD.

(57) ABSTRACT

A microplate for containing a plurality of samples includes a plurality of sample cavities, each sample cavity including at least one dividing element which divides the sample cavity into at least a donor compartment and a receiver compartment. The dividing element is configured to contain one of the samples within one of the donor or receiver compartments when the microplate is in a first orientation. The dividing element is further configured to allow the sample to be transferred at least from the donor compartment to the receiver compartment of one of the sample cavities when the microplate is in a second orientation. A method for transferring a sample between compartments of the microplate is also disclosed.

15 Claims, 5 Drawing Sheets

(51) Int. Cl.
    *G01N 35/00*    (2006.01)
    *G01N 35/04*    (2006.01)

(56) References Cited

U.S. PATENT DOCUMENTS

| | | | |
|---|---|---|---|
| 9,790,465 B2 | 10/2017 | Bennett et al. | |
| 2003/0085952 A1* | 5/2003 | Williams | B41J 2/14008 347/46 |
| 2008/0187949 A1* | 8/2008 | Goldbard | B01L 3/5085 435/29 |
| 2010/0120599 A1* | 5/2010 | Sarofim | G01N 35/04 494/37 |
| 2020/0131459 A1* | 4/2020 | Baum | B01L 3/50853 |
| 2021/0187500 A1* | 6/2021 | Lansing | C12M 23/12 |
| 2022/0127553 A1* | 4/2022 | Atzler | C12M 23/12 |

OTHER PUBLICATIONS

Kim Jin-Young et al.: "96-well format-based microfluidic platform for parallel interconnection of multiple multicellular spheroids," Journal of Laboratory Automation, Society for Laboratory Automation and Screening, US, vol. 20, No. 3, Jan. 1, 2015 (Jan. 1, 2015), pp. 274-282, XP055512179.

* cited by examiner

MICROPLATE FOR CONTAINING A PLURALITY OF SAMPLES

CROSS REFERENCE TO RELATED APPLICATIONS

This application claims benefit to European Patent Application No. EP 21154179.2 filed on Jan. 29, 2021, which is hereby incorporated by reference herein.

FIELD

The invention relates to a microplate for containing a plurality of samples. Further, the invention relates to a method for transferring a sample.

BACKGROUND

Microplates are frequently used in research and development particularly in the life sciences and pharmaceutical industry. A specific application of microplates is in the fields of high-throughput in vitro cell culture, cell assays and cell analysis. More recently, suspension 3D cell culture methods have been developed that allow culturing of cells and cell clusters, such as spheroids or organoids, in microplates. The microplates generally comprise a plurality of cavities for separately culturing the spheroids under differing experimental conditions. Similarly to culturing, cell assays and analysis benefit from the use of microplates by increasing experimental throughput through parallelised high-throughput workflows. Often, these cell assays and analyses are based on imaging the cells or cell clusters inside the cavities of the microplates.

A variety of different types of microplates exist for these specialised applications. Often these microplates comply with an industry standard published by ANSI-SLAS, that aims at ensuring interoperability with laboratory equipment such as robotics and centrifuges.

Furthermore, the document U.S. Pat. No. 9,790,465B2 discloses a well article with at least one chamber for culturing spheroidal cell masses. The document WO 2019/014541 A2 discloses a device for culturing and imaging cells and 3D cell cultures. The device comprises a plurality of wells with each well having a non-circular cross section and having at least one vertex.

However, it is often difficult to combine the requirements of different applications, such that all steps of culturing and analysing samples can be carried out in the same microplate. The requirements often differ in optical, fluid mechanics and/or mass transfer characteristics and the impact of these requirements on the geometry of the microplates, in particular, the cavities of the microplates. Therefore, it is often necessary to use different, individually optimised microplates for culturing and for subsequent assays or analyses. This necessitates the pipetting of samples from one microplate to another, a step that is not only labour-, time- and cost-intensive, but also risks losing or damaging samples as well as introducing pipetting errors. Further, the pipetting step risks contaminating the sample and it is a potential safety hazard for the person carrying out experiments. In particular for organoids, which tend to be more delicate structures, pipetting is associated with the risk of sheering the structures. In fact, pipetting is used as a way of sheering organoids as a means to break bigger organoids into smaller ones during passaging. Moreover, moving samples from one microplate to another via pipetting reduces experimental throughput.

SUMMARY

In an embodiment, the present disclosure provides a microplate for containing a plurality of samples, the microplate comprising: a plurality of sample cavities, each sample cavity comprising at least one dividing element, which divides the sample cavity into at least a donor compartment and a receiver compartment, wherein the dividing element is configured to contain one of the plurality of samples within one of the donor or receiver compartments when the microplate is in a first orientation, and wherein the dividing element is configured to allow the sample to be transferred at least from the donor compartment to the receiver compartment of one of the plurality of sample cavities when the microplate is in a second orientation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
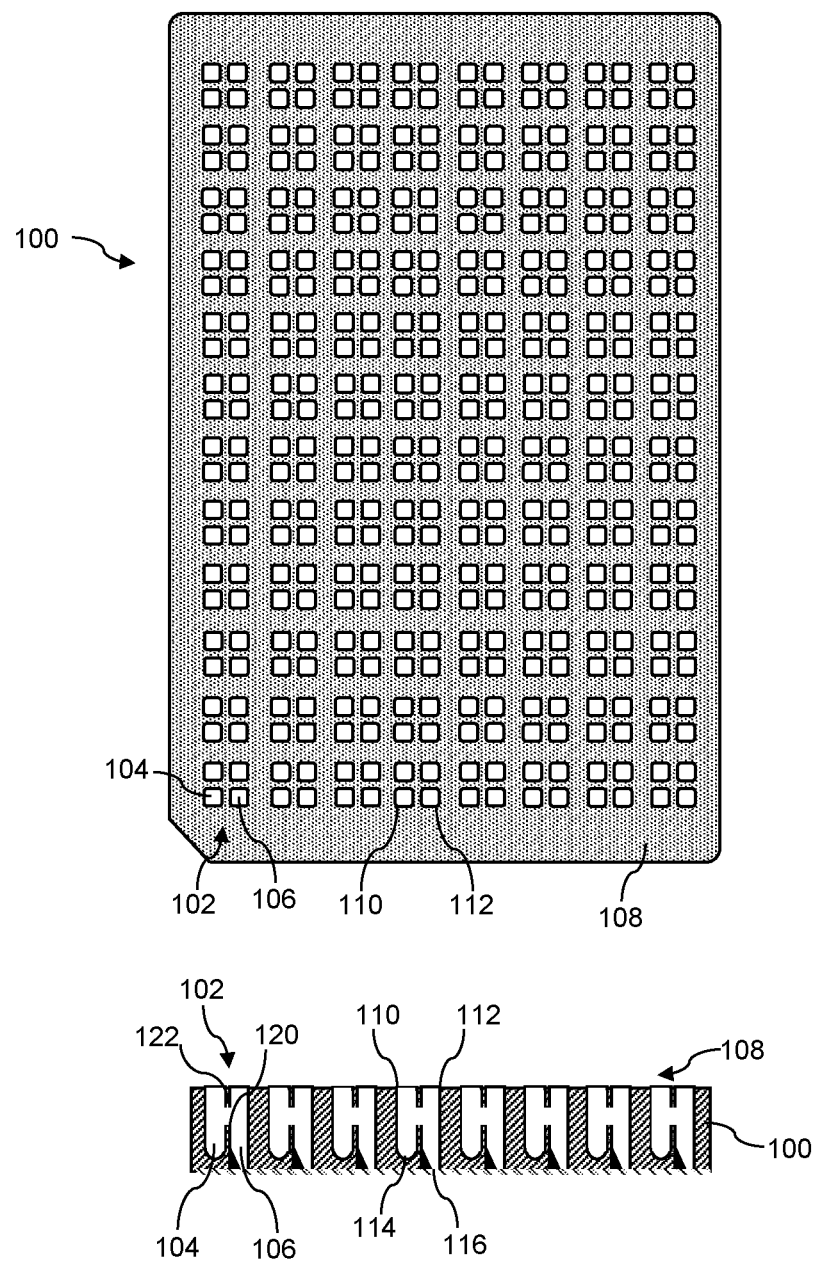
FIG. 1 is a schematic top view and a sectional view of a microplate.

In an embodiment, the present invention provides a microplate and a method for transferring samples that enable culturing as well as imaging of samples within the microplate.

A microplate for containing a plurality of samples, comprises a plurality of sample cavities, each sample cavity comprising at least one dividing element, which divides the sample cavity into at least a donor compartment and a receiver compartment. The dividing element is configured to contain one of the samples within one of the donor or receiver compartments when the microplate is in a first orientation. The dividing element is further configured to allow the sample to be transferred at least from the donor compartment to the receiver compartment of one of the sample cavities, when the microplate is in a second orientation. In the first orientation, the microplate is level or horizontal, with a top side of the microplate facing up and the top side having openings of compartments.

The sample cavities can alternatively be named as sample wells. Further, the microplate can alternatively be named microwell plate or microtiter plate. Each sample cavity comprises at least the donor and receiver compartment. Generally, the optimal geometries of the donor compartment and the receiver compartment differ with their respective uses. For example, the donor compartment has a geometry particularly suited to cell culturing, and often has a concave bottom. This concave surface introduces optical aberrations when imaging the contents of the donor compartment with an inverse microscope. Similarly, liquid inside the donor compartment forms a concave meniscus, which introduces optical aberrations when imaging the contents of the donor compartment from above. On the other hand, the receiver compartment often has a flat transparent bottom, which allows imaging the contents of the receiver compartment without optical aberrations. The dividing element is formed and arranged such that the donor compartment and the receiver compartment are brought into communication when the microplate is moved into the second orientation. This allows the sample to be transferred from the donor compartment to the receiver compartment. Thus, the microplate enables safe and easy transfer of samples between compartments without cross-contamination of the samples and without requiring pipetting of samples.

In some embodiments, the donor compartment has a donor bottom with a rounded inner surface. Alternatively, the donor compartment can have a V-shaped bottom. This enables optimal cell culturing conditions in the donor compartment.

In some embodiments, the receiver compartment has a receiver bottom with a transparent flat surface, in particular, formed from a transparent plano-parallel plate. This enables aberration free imaging of the receiver compartment contents through the receiver bottom.

In particular, each compartment is individually accessible through an opening at a top side of the microplate. This enables particularly flexible use of the compartments of the microplate.

In an embodiment, an inner surface of the receiver compartment is coated with biological and/or chemical compounds. This enables a particularly easy set-up of assays or analyses of the samples.

In an embodiment, an inner surface of the receiver compartment is coated with organisms. This enables a particularly easy set-up of assays or analyses of the samples.

In an embodiment, an inner surface of the donor compartment comprises a low-attachment coating. This allows particularly easy three-dimensional cell culturing of spheroids inside the donor compartment.

In some embodiments, the microplate further comprises a detachable lid configured to cover at least the sample cavities of the microplate and configured to be pressed against the microplate in order to contain the samples in the sample cavities. In particular, the lid covers openings on the top side of the microplate. This enables a particularly safe handling and transfer of the samples.

In an embodiment, the microplate comprises seals arranged around compartment openings, which seal the sample cavities when the lid is pressed against the microplate. This enables a particularly leak-tight closure of the microplate.

In an embodiment, the lid comprises a surface with a seal, which faces the top side of the microplate and seals the sample cavities when the lid is pressed against the microplate. This enables a particularly leak-tight closure of the microplate.

In some embodiments, the lid comprises a flexible distancing element, that keeps the surface of the lid at a distance from the top side of the microplate when the lid is not pressed against the top side of the microplate and that is compressed when the lid is pressed against the top side of the microplate. This allows particularly easy handling of the lid when the lid is not pressed against the microplate and when the lid is pressed against the microplate.

In some embodiments, the lid comprises at least one guiding element which is configured to guide samples during transfer from the donor compartment to the receiver compartment of one of the sample cavities. This enables for a particularly reliable transfer of samples between the compartments.

In some embodiments, the guiding element acts as a seal when the lid is pressed against the top side of the microplate in order to contain samples in the sample cavities. This enables a particularly leak-tight closure of the microplate.

According to another aspect, a method for transferring a sample between compartments of the microplate is provided. The method comprising the following steps: culturing samples in the donor compartment of the microplate in the first orientation; transferring the samples from the donor compartment into the receiver compartment by turning the microplate into the second orientation; returning the microplate to the first orientation.

FIG. 1 shows a schematic top view and a corresponding sectional view of a microplate 100. The microplate 100 comprises 192 sample cavities 102 arranged in an 8 by 24 grid. Each cavity 102 comprises a donor compartment 104 and a receiver compartment 106. Thus, the microplate 100 comprises 384 compartments 104, 106. Alternatively, the microplate 100 can have additional or fewer sample cavities 102.

Each one of the compartments 104, 106 is open to a top side 108 of the microplate 100, comprising an opening, in particular, the donor compartment 104 comprises a donor opening 110 and the receiver compartment 106 comprises a receiver opening 112. The openings 110, 112 allow individual access to the inside of the respective compartment 104, 106, for example, for individually adding or removing a sample using a manual pipette or with a liquid handling robot. The openings 110, 112 of the microplate 100 in FIG. 1 are rectangular. Similarly, side walls of the compartments 104, 106 are rectangular in planes parallel to the top side 108. Alternatively, the openings 110, 112 and the compartments 104, 106 can have a different geometry, for example they can be round.

In some embodiments, all cavities 102 of the microplate 100 have the same size and geometry. Alternatively, the size and geometry of some or all of the cavities 102 of the microplate 100 can differ.

Further, the top view shows the compartments 104, 106 being arranged in groups of four on the top side 110 of the microplate 100. Alternatively, the compartments 104, 106 can be arranged evenly on the top side 110 of the microplate 100, or they can be arranged according to a different pattern.

Each one of the compartments 104, 106 comprises a bottom, in particular, the donor compartment 104 comprises a donor bottom 114 and the receiver compartment 106 comprises a receiver bottom 116. The donor bottom 114 has a round inner surface, in particular, a concave surface or a hemispherical surface, and is frequently termed a round bottom. The shape of the donor bottom 114 of the microplate 100 is formed for cell culturing to produce cell clusters such as spheroids, microtissues, tumoroids, or organoids, in particular, for three-dimensional cell culturing in suspension without scaffolds. Alternatively, the donor bottom 114 can be V-shaped.

The receiver bottom 116 is flat. In addition, the receiver bottom 116 is transparent, particularly, it is an optically clear plane-parallel plate. For example, the receiver bottom can be manufactured from glass or optical-grade polystyrene, cyclic olefin copolymers or polycarbonate. Thus, the inside of the receiver compartment 106 can be viewed through the receiver bottom 116, for example with a microscope, in particular with an inverted microscope. This allows observing of, for example, a sample in the receiver compartment 106 with a minimal amount of optical aberrations. In addition, when imaging the sample through the receiver bottom 116, the distance between the sample and the microscope objective is reduced compared to imaging the sample through the receiver opening 112 of the microplate 100. This is particularly advantageous when using high numerical aperture objectives that require short working distances between a front lens of the objective and the imaged sample.

The compartments 104, 106 of each one of the sample cavities 102 are separated from each other by means of a dividing element 120. The dividing element 120 is formed and arranged to contain samples in one of the compartments 104, 106, particularly in the donor compartment 104, when the microplate 100 is in a first orientation. In the first orientation the microplate 100 is in a level orientation with the microplate 100 resting on a bottom side of the microplate, the bottom side of the microplate 100 being opposite and in parallel to the top side 108 of the microplate 100. Thus, when the microplate 100 is in the first orientation samples are contained in one of the compartments 104, 106 such that they do not spill over into the other one of the compartments 104, 106 of one of the sample cavities 102. Further, the samples do not spill over when the microplate 100 is incubated with a movement in the plane of the top side 108 of the microplate 100.

Further, the dividing element 120 extends along a line perpendicular to the top side 108 of the microplate 100 and between the donor compartment 104 and the receiver compartment 106 of one of the sample cavities 102. Therefore, the dividing element 120 forms part of one of the side walls of each compartment 104, 106. The side walls of each compartment 104, 106 extend from the bottom 114, 116 of the compartment 104, 106 to the top side 108 of the microplate 100. In contrast, the dividing element 120 extends from the bottom 114, 116 of the compartment 104, 106, but it is shorter overall than the side walls of the compartment 104, 106.

In addition, the dividing element 120 can comprise several parts, which are configured to separate the compartments 104, 106, as well as to allow the transfer of samples from one compartment 104, 106 to another compartment 104, 106 of one of the sample cavities 102. The dividing element 120 of microplate 100 comprises an upper part 122, a corresponding lower part is indicated in FIG. 1 by the reference sign 120. Between the lower part 120 and the upper part 122, there is an opening, which brings into fluid communication the donor compartment 104 and the receiver compartment 106, in particular, when the microplate 100 is in a second orientation. In some embodiments the microplate 100 has no upper part 122.

In some embodiments, each cavity 102 can have additional compartments, for example, the cavity 102 can comprise three compartments. Moreover, each cavity 102 can comprise additional dividing elements 120, in particular to separate the additional compartments.

In some embodiments, the compartments 104, 106, in particular the receiver compartments 106, can be pre-filled with chemical compounds, biochemical compounds and/or organisms. In particular, an inner surface of the compartments 104, 106 can be coated with these compounds or organisms. The compounds can be, for example, drugs, small molecules, metabolites, proteins, reagents, siRNA, enzymes, and compounds for gene editing, such as CRISPR. The organisms can be, for example, algae, archaea, bacteria, fungi, unicellular eukaryotes, multicellular organisms, parasites, pathogens, viruses, and prions. Additionally, these compounds and organisms can be lyophilised and/or encapsulated. Further, these compounds and organisms can be brought into suspension upon addition or transfer of a liquid sample to the compartment 104, 106.

Moreover, the inner surface of the compartments 104, 106 can alternatively or additionally be coated with a low-attachment coating. In particular, the inner surface of the donor compartment 104 can be coated with a low-attachment coating to facilitate three-dimensional culturing of spheroids in suspension.

Figure 2:
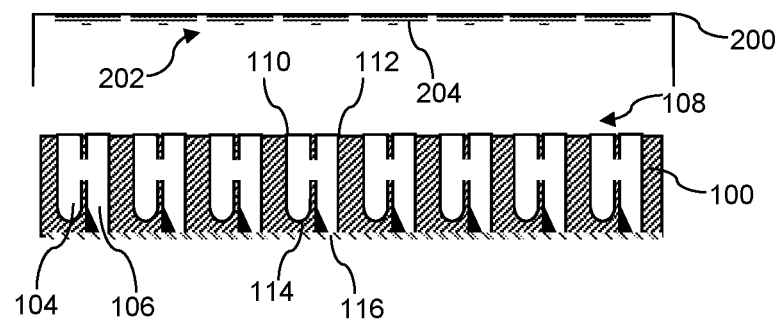
FIG. 2 is a schematic sectional view of the microplate with a lid.

FIG. 2 is a schematic sectional view of the microplate 100 with a lid 200. Elements with the same structure or function have the same reference signs. The lid 200 comprises a surface 202 that is oriented towards the top side 108 of the microplate 100. The surface 202 of the lid 200 comprises seals 204, which are each arranged on the surface 202 such that they are aligned with the compartments 104, 106, in particular, with the openings 110, 112 of the compartments 104, 106 of the cavities 102. Alternatively, the seal 204 can be sized such that it covers the entire top side 108 of the microplate 100.

Figure 3:
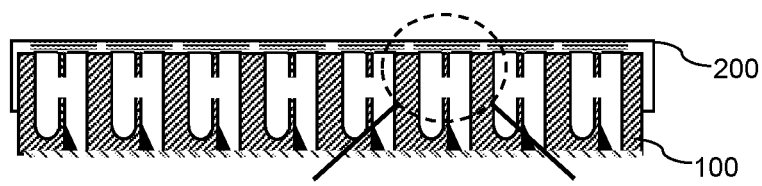
FIG. 3 is a detailed schematic sectional view of a sample cavity of the microplate with the lid and a schematic top view of the sample cavity.
Figure 3:
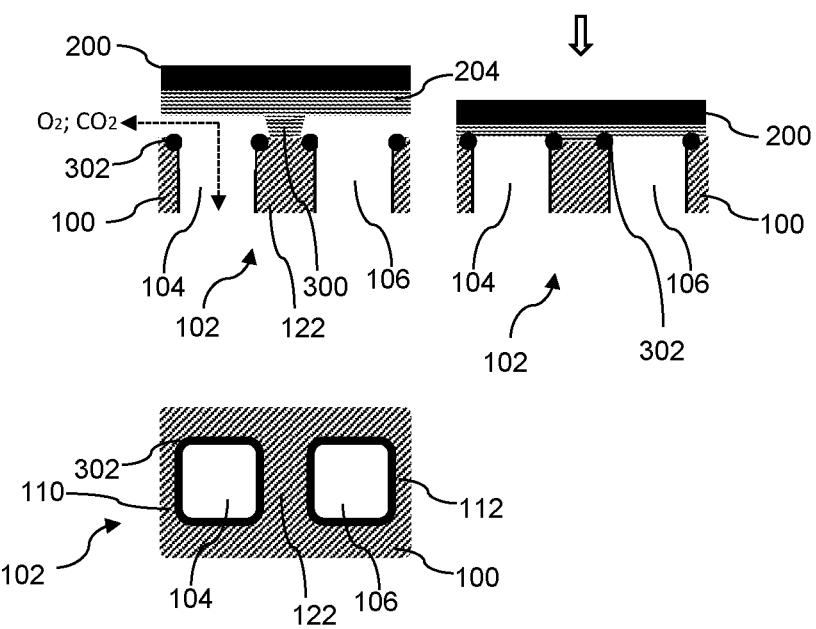

FIG. 3 is a schematic sectional view of the microplate 100 with the lid 200 resting on the top side of the microplate 100 and a detailed schematic sectional view of the sample cavity 102 of the microplate 100 with the lid 200 and a schematic top view of the sample cavity 102.

The lid 200 comprises a flexible distancing element 300, that keeps the surface 202 and the seal 204 of the lid 200 at a distance to the top side 108 of the microplate 100 when the lid 200 is not pressed against the top side 108. This allows mass transfer between the inside of the cavity 102 and the outside, in particular gases such as oxygen and carbon dioxide, can be exchanged between the inside of the cavity 102 and the outside. When the lid 200 is pressed against the top side 108, the flexible distancing element 300 is compressed and the lid 200, in particular the seal 204, seals the cavity 102. Thus, the contents of the cavity 102, in particular the contents of the compartments 104, 106, cannot escape or leak from the cavity 102.

Additionally or alternatively, the microplate 100 can comprise circumferential seals 302 arranged around openings 110, 112 of the compartments 104, 106. These seals 302 are configured to seal the cavities 102 of the microplate 100 when the lid 200 is pressed against the top side 108 of the microplate 100.

Figure 4:
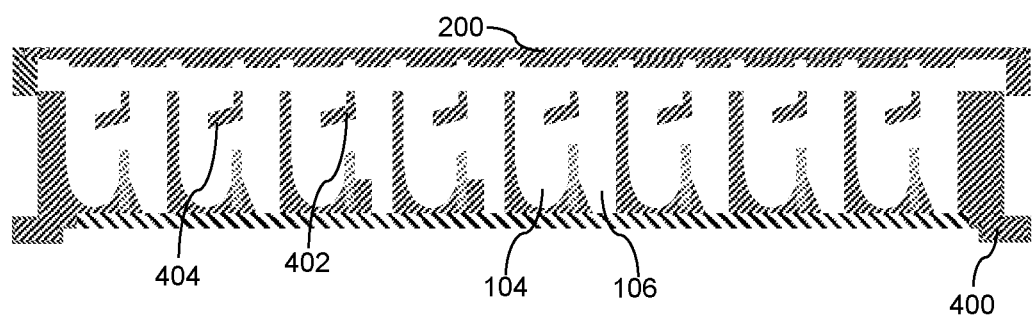
FIG. 4 is a schematic sectional view of the microplate according to a further embodiment with the lid.

FIG. 4 is a schematic sectional view of a microplate 400 with the lid 100. The microplate 400 comprises a dividing element 402, which is configured to guide a sample when it is transferred from the donor compartment 104 to the receiver compartment 106. In particular, the dividing element 402 comprises a sloped part 404, which guides a sample from the donor compartment 104 to the receiver compartment 106 when it is transferred to the receiver compartment 106.

Figure 5:
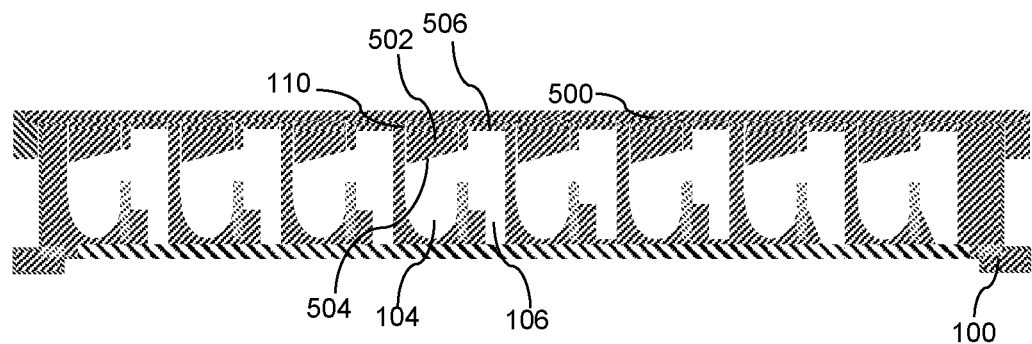
FIG. 5 is a schematic sectional view of the microplate with the lid according to a further embodiment.

FIG. 5 is a schematic sectional view of the microplate 100 with a lid 500. The lid 500 comprises a seal 502, which is configured to fit into the opening 110 of the donor compartment 104. When the lid 500 is pressed against the microplate 100, the seal 502 seals the donor compartment 104. Further, the seal 502 is formed with a sloped surface 504, which is configured as a guiding element to guide a sample when it is transferred from the donor compartment 104 to the receiver compartment 106. Further, the lid 500 comprises a seal 506, which seals the opening 112 of the receiver compartment 106.

Figure 6:
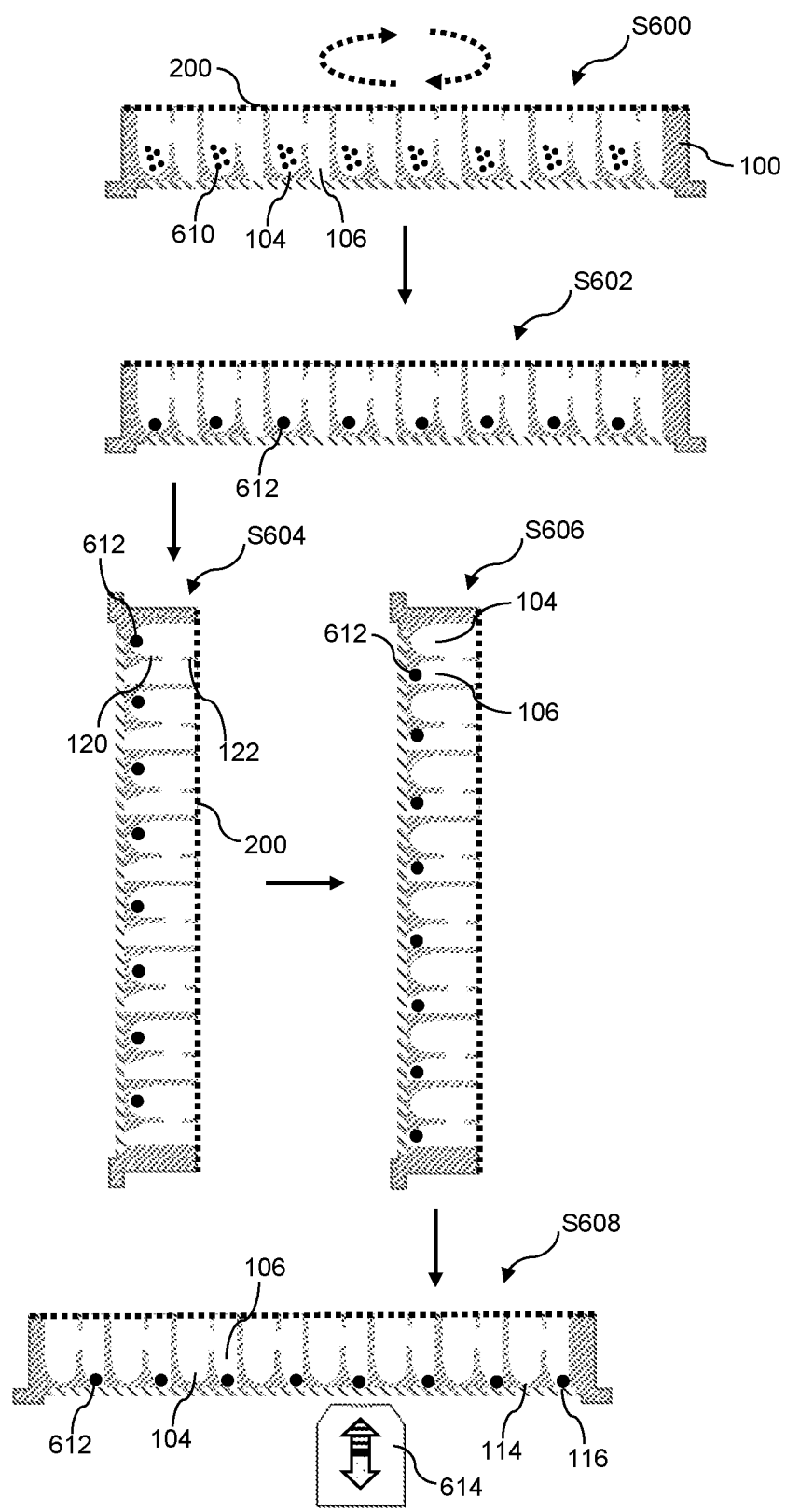
FIG. 6 is a flow chart of a method for transferring samples from a donor compartment to a receiver compartment of the sample cavity.

FIG. 6 shows a flow chart with the steps of a method for transferring samples from the donor compartment 104 to the receiver compartment 106 of the sample cavities 102 of the microplate 100.

In a first step indicated by reference sign S600 the donor compartments 104 of the microplate 100 are filled with a liquid growth medium and inoculated with a small number of cells 610. In addition, the lid 200 is placed on the microplate 100 before the microplate 100 is incubated and shaken with an orbital movement in the first orientation.

In a step S602 the incubation is stopped after the cells 610 have formed spheroids 612 or organoids. The spheroids 612 are also called samples and consist of a cluster of multiple cells 610 of either a single type or of a range of different types.

In a step S604 the microplate 100 is turned from the first orientation into the second orientation. In the second orientation the donor compartment 104 is above the receiver compartment 106 such that the contents of the donor compartment 104, including the spheroids 612, flow into the receiver compartment 106. In particular, the spheroids 612 pass through the opening between the lower part 120 and the upper part 122 of the dividing element 120.

In a step S606 the microplate 100 is turned from the second orientation back into the first orientation after the sample 612 was transferred into the receiver compartment 106.

During steps S604 and S606, in particular when the microplate 100 is turned from the first into the second orientation, the lid 200 of the microplate 100 is pressed against the top side 108 of the microplate 100 to ensure a leak-tight seal of the compartments 104, 106. This prevents samples 612 leaking from the compartments 104, 106.

In a step S608 the microplate 100 is placed in the first orientation on a stage of a microscope, in particular an inverted microscope. This allows analysing, in particular imaging, the spheroids 612 through the transparent bottom 116 of the receiver compartment 106 by means of an objective 614 of the microscope, in particular, with a high numerical aperture objective.

The method according to the flow chart in FIG. 6 allows the culturing of samples 612 in the donor compartment 104 of the microplate 100, followed by transfer of the samples 612 to the receiver compartment 106 of the microplate 100 and imaging of the samples 612 in the receiver compartment 106. Thus, the microplate 100 allows culturing as well as imaging of the samples 612, each in optimal conditions for the respective purpose, without the need to pipette the sample to a different microplate.

The steps S600 to S608 of the method can be automated, for example with a laboratory robot.

Figure 7:
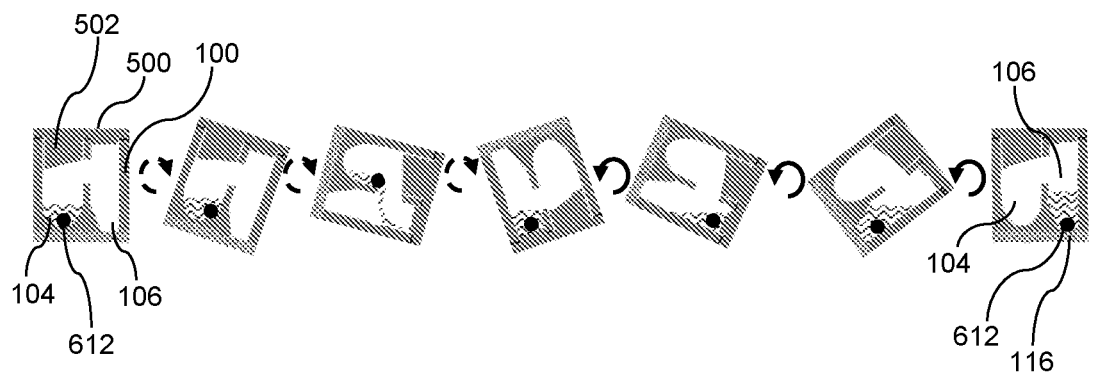
FIG. 7 is a flow chart showing the transfer of a sample from the donor compartment to the receiver compartment of the sample cavity.

FIG. 7 is a flow chart showing the transfer of a sample from the donor compartment 104 to the receiver compartment 106 of the sample cavity 102. FIG. 7 shows the single sample cavity 102, which is representative of all sample cavities 102 of the microplate 100. The sample cavity 102 is covered and sealed by the lid 500 according to FIG. 5. The sample 612 is shown comprising a liquid medium. The sample 612 is transferred from the donor compartment 104 to the receiver compartment 106 by turning the sample cavity 102 and accordingly the microplate 100 from the first orientation into the second orientation and back into the first orientation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 400 Microplate
102 Sample cavity
104 Donor compartment
106 Receiver compartment
108 Top side of microplate
110, 112 Opening of compartment
114 Donor bottom
116 Receiver bottom
120, 402 Dividing element
122 Upper part of dividing element
200, 500 Lid
202 Surface of lid
204, 302, 502, 506 Seal
300 Distancing element
404 Sloped part of dividing element
504 Sloped surface of seal
610 Cells
612 Spheroids
614 Objective
S600 to S608 Method steps

The invention claimed is:

1. A microplate for containing a plurality of samples, the microplate comprising:
   a plurality of sample cavities, each respective sample cavity of the plurality of sample cavities comprising at least one dividing element, wherein the dividing element divides the respective sample cavity into at least a donor compartment and a receiver compartment, wherein the microplate has a top side and a bottom side opposite the top side, the donor compartment and the receiver compartment having openings on the top side, wherein the dividing element comprises a lower part and an upper part, wherein the lower part extends, along a line perpendicular to the top side of the microplate, from a bottom of the donor compartment or the receiver compartment and is shorter than side walls of the donor compartment or the receiver compartment, wherein the upper part is directly above the lower part, and wherein the dividing element has an opening between the upper part and the lower part so that, as the microplate is in a first orientation with the microplate resting on the bottom side, a respective sample of the plurality of samples contained within one of the donor compartment or the receiver compartment of the respective sample cavity does not spill over into the other one of the donor compartment or the receiver compartment, and as the microplate is in a second orientation different from the first orientation, the respective sample is allowed to be transferred between the donor compartment and the receiver compartment through the opening.

2. The microplate according to claim 1, wherein the donor compartment has a bottom with a rounded inner surface.

3. The microplate according to claim 1, wherein the receiver compartment has a bottom with a transparent flat surface.

4. The microplate according to claim 1, wherein each of the donor compartment and the receiver compartment has a respective opening so as to be individually accessible.

5. The microplate according to claim 1, wherein an inner surface of the receiver compartment is coated with biological or chemical compounds.

6. The microplate according to claim 1, wherein an inner surface of the receiver compartment is coated with organisms.

7. The microplate according to claim 1, further comprising a detachable lid configured to cover at least the plurality of sample cavities of the microplate, wherein the detachable lid is configured to be pressed against the top side of the microplate in order to contain the plurality of samples in the plurality of sample cavities.

8. The microplate according to claim 7, further comprising a plurality of seals, wherein each respective seal of the plurality of seals is arranged on a respective opening of the donor compartment or the receiver compartment, wherein the plurality of seals seal the plurality of sample cavities as the detachable lid is pressed against the top side of the microplate.

9. The microplate according to claim 7, wherein the detachable lid comprises a surface with a seal, wherein the seal seals the plurality of sample cavities as the detachable lid is pressed against the top side of the microplate.

10. The microplate according to claim 7, wherein the detachable lid comprises a compressible element configured to keep a surface of the lid at a distance from the top side of the microplate as the detachable lid is not pressed against the top side of the microplate.

11. The microplate according to claim 7, wherein the detachable lid comprises at least one guiding element configured to guide a respective sample during transfer from the donor compartment to the receiver compartment of one of the plurality of sample cavities.

12. The microplate according to claim 11, wherein the guiding element acts as a seal when the detachable lid is pressed against the top side of the microplate in order to contain the plurality of samples in the plurality of sample cavities.

13. A method for transferring a respective sample of the plurality of samples between the donor compartment and the receiver compartment of a respective sample cavity of the plurality of sample cavities of the microplate according to claim 1, the method comprising:
   culturing the respective sample in the donor compartment as the microplate is resting on the bottom side in the first orientation,
   transferring the respective sample from the donor compartment into the receiver compartment through the opening by turning the microplate into the second orientation so that the donor compartment is above the receiver compartment, and
   returning the microplate to the first orientation.

14. The method according to claim 13, wherein the microplate further comprises a detachable lid configured to cover at least the plurality of sample cavities of the microplate, and wherein prior to the transferring the respective sample from the donor compartment into the receiver compartment, the detachable lid is placed on the microplate and pressed against the top side of the microplate.

15. The method according to claim 13, wherein the respective sample transferred to the receiver compartment is observed through a bottom of the receiver compartment by using a microscope.

* * * * *